United States Patent Office 3,082,243
Patented Mar. 19, 1963

3,082,243
UNSATURATED ESTERS OF 2,2,4-TRIMETHYL 1,3-PENTANEDIOL MONOISOBUTYRATE
Herman E. Davis and Vinton A. Hoyle, Jr., Kingsport, Tenn., assignors to Eastman Kodak Company, Rochester, N.Y., a corporation of New Jersey
No Drawing. Filed Dec. 9, 1960, Ser. No. 74,766
4 Claims. (Cl. 260—486)

This invention relates to novel polymerizable monomeric materials. In particular it relates to esters of 2,2,4-trimethyl 1,3-pentanediol monoisobutyrate with α,β-unsaturated monocarboxylic acids. These esters have utility in the preparation of new and useful homopolymers and copolymers for the plastic industry.

The products of the invention can be prepared by reacting 2,2,4-trimethyl 1,3-pentanediol monoisobutyrate with an α,β-unsaturated aliphatic monocarboxylic acid such as acrylic acid, methacrylic acid, or crotonic acid, following the usual procedures for preparing unsaturated esters. One suitable method is to reflux the 2,2,4-trimethyl 1,3-pentanediol monoisobutyrate with a slight excess of the unsaturated acid in the presence of an esterification catalyst, a polymerization inhibitor, and an azeotroping solvent such as benzene or toluene. The mixture is refluxed and water formed by esterification is removed azeotropically. The catalyst and the azeotroping solvent are then removed and the product is purified by distillation. By this procedure we obtain a colorless mobile liquid of the following formula:

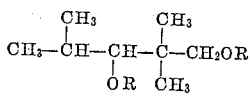

wherein one of the R's is the isobutyryl radical,

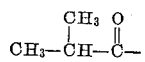

and the other is the acyl radical of an α,β-unsaturated aliphatic monocarboxylic acid, such as

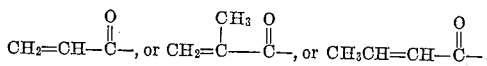

The two different types of acyl radicals, R, are interchangeable in position but the molecule must contain one of each type. In other words, these are mixed esters that contain one unsaturated acyl substituent and one saturated acyl substituent, i.e., isobutyryl.

The starting material, 2,2,4-trimethyl 1,3-pentanediol monoisobutyrate, can be prepared by the self-condensation of isobutyraldehyde according to known procedures. See, for example, the paper by Kulpinski and Nord, J. Org. Chem., 8, 256, 268 (1943). The conditions of the condensation can be adjusted so that the product is either 2,2,4-trimethyl 1,3-pentanediol 1-isobutyrate or 2,2,4-trimethyl 1,3-pentanediol 3-isobutyrate or a mixture of the two isomers. Either isomer or a mixture of the two can be used as starting materials for preparing the mixed unsaturated esters of the invention.

The monomeric unsaturated esters of our invention have been polymerized by the "Redox Emulsion" technique and by bulk polymerization to give tough, flexible polymers. The polymers so formed are useful as viscosity improvers for lubricating oils and in plastic molding formulations. These monomers may also be copolymerized with other monomers such as methyl methacrylate, styrene, vinyl acetate, acrylonitrile, methacrylonitrile, and other typical vinyl monomers. These copolymerizations take place in good yield. The ratio of each monomer may be varied in order to obtain the desired polymer properties.

The following examples illustrate the invention.

Example 1

To a 1-liter round-bottom flask equipped with a stirrer, Dean-Stark trap, reflux condenser, and thermometer were added one mole (216 g.) of 2,2,4-trimethyl 1,3-pentanediol monoisobutyrate, 1.2 moles (103 g.) of methacrylic acid, 12 g. of p-toluenesulfonic acid, 200 ml. of benzene, 0.1 g. of methylene blue, and 0.1 g. of hydroquinone. This mixture was then refluxed for 7 hours whereupon 18 ml. of water was collected. The catalyst and excess methacrylic acid were then neutralized with a saturated sodium bicarbonate solution. The solution was washed with water until neutral, inhibited with 1 g. of hydroquinone and the benzene removed by distillation. On continued distillation of the crude product through a 20 plate packed column there was obtained a fraction boiling at 90–92° C. under 0.1–0.3 mm. pressure. This gave 250 g. of a water white liquid.

The 2,2,4-trimethyl 1,3-pentanediol monoisobutyrate methacrylate obtained in Example 1 was emulsion polymerized by the following procedure. A mixture of 50 g. of the 2,2,4-trimethyl 1,3-pentanediol monoisobutyrate methacrylate, 250 g. of water, 1.25 g. of Duponol ME (2.5%), 0.5 g. of ammonium persulfate, and 0.38 g. of sodium meta bisulfite was placed in a polymerization bottle, the air replaced with nitrogen and the bottle capped. The mixture was agitated for 24 hours at 40° C. After breaking the emulsion, the polymer was recovered by filtration, and then washed thoroughly with warm water to remove all traces of catalyst and emulsifying agent. The dried polymer weighed 44.0 g. (88.0% yield). This material was soluble in benzene, toluene and chloroform, and insoluble in acetone, ethyl acetate, and the lower alcohols. This powder was molded into a tough plastic button at 250° F. (Duponol ME, a product of E. I. du Pont de Nemours & Co., is a fatty alcohol sulfate emulsifying agent.)

The monomer was also copolymerized with methyl methacrylate using the same procedure as described above except that one-half of the 2,2,4-trimethyl 1,3-pentanediol monoisobutyrate methacrylate was replaced with methyl methacryate. A 96.4% yield of the copolymer was obtained. This product gave a somewhat rigid button when molded.

The 2,2,4-trimethyl 1,3-pentanediol monoisobutyrate methacrylate was copolymerized with acrylonitrile and methacrylonitrile in yields in excess of 90%.

Example 2

The preparation of a crotonate ester was carried out as described in Example 1 above except that the methacrylic acid of Example 1 was replaced with 103 g. (1.2 moles) of crotonic acid. On distillation, 260 g. of a mobile colorless liquid was obtained. This monomer was polymerized to obtain useful polymeric materials using the conditions outlined for the methacrylate.

Preparation of the acrylic acid ester of 2,2,4-trimethyl 1,3-pentanediol monoisobutyrate by an alcoholysis reaction with an ester of acrylic acid is illustrated by the next example.

Example 3

To a 1 liter round-bottom flask equipped with a thermometer, 18 inch distillation column packed with copper shavings, and a distillation head was added the following: 216 g. (1 mole) of 2,2,4-trimethyl 1,3-pentanediol monoisobutyrate, 12 g. p-toluenesulfonic acid, 15 g. of hydroquinone, 5 g. methylene blue, and 400 g. (4 moles) of ethyl acrylate. The mixture was refluxed until the ethanol-ethyl acrylate azeotrope began to form in the distillation head (evidenced by the boiling point, 77° C.). The azeotrope containing the ethanol was slowly removed as it was formed. The catalyst was neutralized with a saturated sodium bicarbonate solution and then the excess ethyl acrylate was removed by distillation under reduced pressure. The colorless product was then distilled.

The invention has been described in detail with particular reference to preferred embodiments thereof, but it will be understood that variations and modifications can be effected within the spirit and scope of the invention as described hereinabove and as defined in the appended claims.

We claim:
1. Esters of the formula

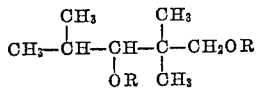

wherein one R is a radical selected from the group consisting of

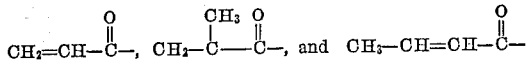

and the other R is

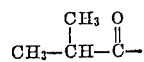

2. The mixed ester 2,2,4-trimethyl 1,3-pentanediol monoisobutyrate methacrylate.
3. The mixed ester 2,2,4-trimethyl 1,3-pentanediol monoisobutyrate crotonate.
4. The mixed ester 2,2,4-trimethyl 1,3-pentanediol monoisobutyrate acrylate.

References Cited in the file of this patent
UNITED STATES PATENTS
2,691,663    Smith _____ Oct. 12, 1954

OTHER REFERENCES
Klupinski: Journal of Organic Chemistry, 1943, vol. 8, pp. 256 to 270, QD 241 J6.